United States Patent

Hutchinson et al.

[15] 3,693,089
[45] Sept. 19, 1972

[54] HOUSING ASSEMBLY FOR MINIATURE RADIO APPARATUS WITH SELF CONTAINED BATTERY

[72] Inventors: Thomas R. Hutchinson, Sunrise Golf Village; Marco Hans Lombard, Miami, both of Fla.

[73] Assignee: Motorola, Inc., Franklin Park, Ill.

[22] Filed: May 20, 1971

[21] Appl. No.: 145,165

[52] U.S. Cl. ................325/119, 325/353, 325/355, 317/101 CB, 312/7 R, 174/52 R
[51] Int. Cl. ..............................................H04b 1/08
[58] Field of Search......325/119, 352, 353, 355, 361, 325/364; 317/101 CB, 101 DH; 312/7 R; 174/52 R

[56] References Cited

UNITED STATES PATENTS

| | | | |
|---|---|---|---|
| 2,487,601 | 11/1949 | Schnoor et al | 325/353 |
| 1,987,478 | 1/1935 | Hendrickson et al | 312/7 |
| 2,924,705 | 2/1960 | Jones | 325/361 |
| 3,550,008 | 12/1970 | Bright | 325/364 |

Primary Examiner—Robert L. Richardson
Assistant Examiner—Peter M. Pecori
Attorney—Mueller & Aichele

[57] ABSTRACT

Housing assembly for miniature radio apparatus, such as a radio pager, having a molded frame member which houses the chassis and forms one end and two opposite outer sides of the housing. Space for a battery is provided adjacent the end of the housing formed by the frame member. A flexible plastic insulating member has a central part secured to the end of the frame member with flaps covering the chassis and the battery. A U-shaped cover member slides in grooves in the frame member to form the other end and the other two outer sides of the housing, thereby providing a completely enclosed housing. The cover bears against the flaps to hold the chassis and battery in the proper positions within the housing. The cover can slide with respect to the frame member to open the housing at one end to afford access to the battery. A spring biased detent is secured to the frame member, which cooperates with an opening in the cover member to hold the cover completely closed. This detent can be overriden to permit the cover to slide part way open for access to the battery. The detent engages a tongue at a further opening in the cover to prevent further movement of the cover with respect to the housing, preventing access to the radio chassis. A key may be provided to release the detent from the tongue for removal of the cover from the frame member.

12 Claims, 8 Drawing Figures

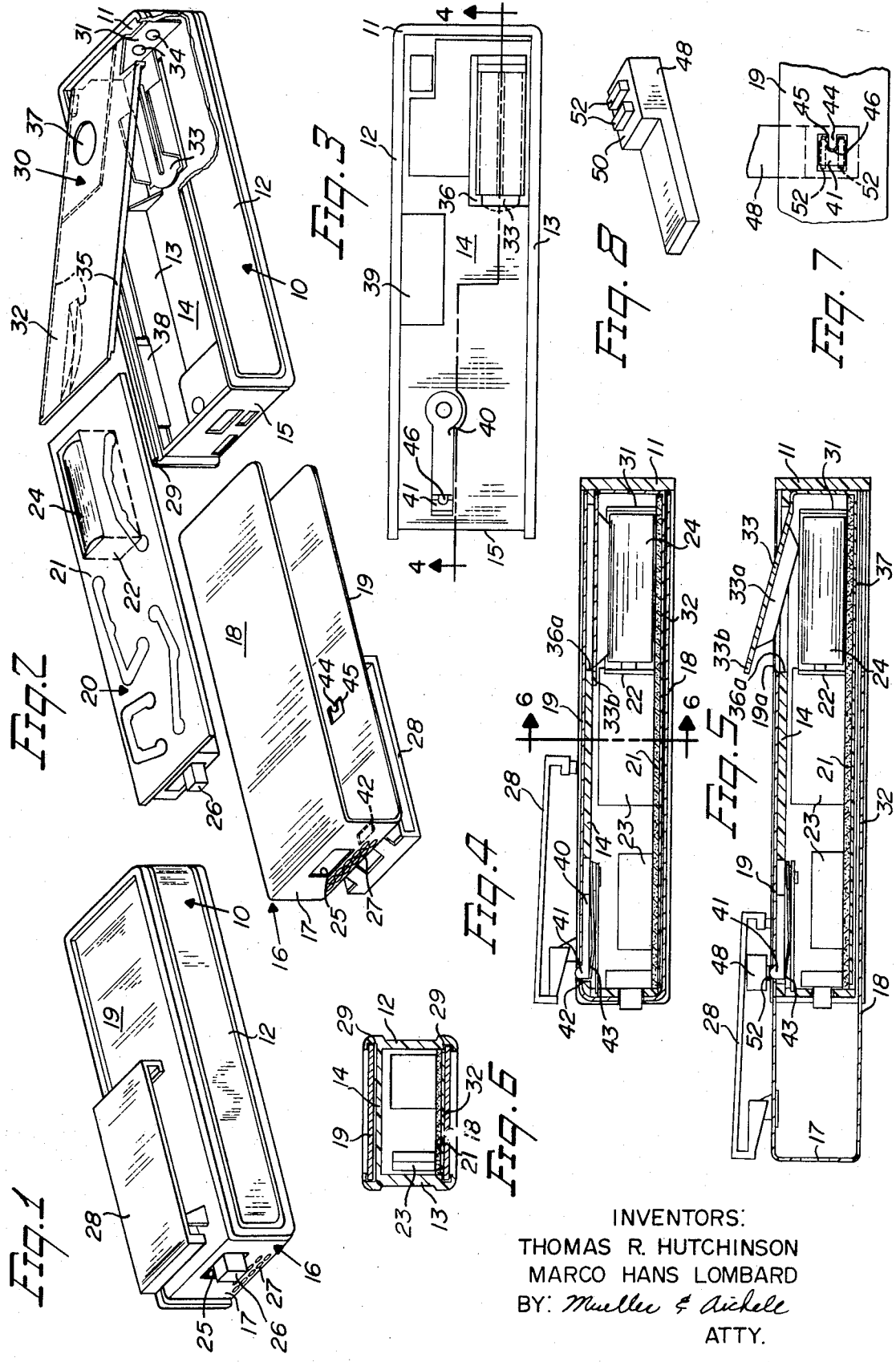

3,693,089

HOUSING ASSEMBLY FOR MINIATURE RADIO APPARATUS WITH SELF CONTAINED BATTERY

BACKGROUND OF THE INVENTION

In small radio apparatus, such as a radio receiver or pager, and which contains a battery for powering the apparatus, it is necessary to afford access to the battery for replacement of the same. It is known to provide a plastic housing, with a removable section secured thereto, as by screws engaging inserts provided in the molded housing. This has the objection that the inserts molded in the plastic housing to receive the screws involve substantial cost, and this construction also results in a high percentage of rejects, further increasing the cost. To prevent loss of the screws, captive machine screws may be used, which are relatively expensive. Further, the screws have an objectionable appearance, and may project slightly to catch on the pocket when the radio is inserted or removed to damage the same.

To provide access to the battery in such a housing requires the use of a screwdriver or coin, when it is desired to change the battery. Other removable sections for access to the battery have been used such as a small button with threads or other interlocking projections, but a small cover has the objections that it is easily lost or misplaced. In some cases, plastic members with engaging projections have been used to cover the battery compartment, but these do not provide a secure fastening after being removed a number of times. Hinged doors have also been used, but the hinge structure is relatively expensive, and these structures have not been entirely satisfactory.

In addition to providing access to the battery, it is also necessary that access to the chassis be provided. However, the chassis should not be exposed when it is only desired to exchange the battery, and it is preferable that access to the chassis by the user of the equipment be made difficult to prevent undesired tampering with the chassis and the components thereon.

SUMMARY OF THE INVENTION

It is an object of this invention to provide a housing assembly for miniature battery operated radio apparatus wherein the housing can be opened without the use of tools to provide access to the battery, without exposing the radio chassis.

A further object of the invention is to provide an improved housing arrangement for a miniature radio apparatus wherein the housing can be opened to give access to the battery without the use of a tool, and can be opened to provide access to the chassis only by use of a special key or tool.

Another object of the invention is to provide a housing structure for a miniature radio device having a frame member and a cover member which cooperate to form a completely enclosed housing, and wherein the cover member is slidable with respect to the frame member and is held in closed position by engagement of a detent with a first part of the cover member and in a position providing access to the battery by engagement of the detent with a second part of the cover member.

The miniature battery operated radio apparatus of the invention includes a frame member having provisions for receiving a radio chassis and a battery for powering the chassis. The frame member can be molded of plastic material and has portions forming one end and two opposite outer sides of a housing for apparatus. A U-shaped cover member is slidably positioned in grooves in the frame member and forms the other two opposite outer sides of the housing, which are at right angles to the two sides formed by the frame member, and the second end of the housing. The cover member includes a clip for holding the radio apparatus which may be a radio pager, in the pocket or 'n the belt of the person using the same. Interposed between the frame member and the cover is a resilient insulating member having a mounting portion secured to the one end of the frame members and first and second flaps extending therefrom. The first flap covers the chassis and holds the same in position on the frame member, and the second flap provides a cover over the battery. A spring structure secured to the frame member has a projecting portion which forms a detent and engages an aperture in the cover to hold the cover completely closed. The detent can be overcome so that the cover can be slid on the frame member to a position such that the second flap can be flexed outwardly to expose the battery to permit installing or removal of the same. The cover has a cutout portion with a tongue which in this position of the cover engages the projecting portion of the detent to prevent the cover from being further removed. In this position, the cover holds the first flap over the radio chassis so that it protects the same. The detent can be released from the tongue to permit further removal of the cover only by the use of a special tool, to thereby protect the radio chassis and components from exposure and objectionable tampering by the user.

BRIEF DESCRIPTION OF THE DRAWINGS

FIG. 1 is a perspective view of a radio pager in accordance with the invention;

FIG. 2 is an exploded view of the pager of FIG. 1 showing the housing parts and the chassis;

FIG. 3 is a plan view of the back side of the molded frame member of the housing;

FIG. 4 is a cross-sectional view of the pager with the housing closed showing the frame member along the line 4—4 of FIG. 3;

FIG. 5 is a cross-sectional view with the cover partially open to expose the battery;

FIG. 6 is a cross-sectional view along the lines 6—6 of FIG. 4;

FIG. 7 is an enlarged view showing the detent structure; and

FIG. 8 illustrates the key which is used to release the detent.

DETAILED DESCRIPTION

The radio apparatus of the invention is illustrated in the drawings as a radio pager. FIG. 1 shows the housing containing the radio apparatus, and FIG. 2 shows the parts in exploded relation. The housing includes a molded member 10 which forms a frame for supporting the chassis 20, and which also forms one end 11 and a pair of opposite outer sides 12 and 13 of a housing for the radio apparatus. The frame member 10 also includes a web or wall 14 extending between the sides 12 and 13, and an end 15, which do not form exposed sides of the housing.

The chassis 20 includes an insulating circuit board 21 having conductors therein which is positioned in the frame member 10, opposite the web 14. Components extend from the bottom side of the circuit board 21 with the components indicated at 23 in FIGS. 4 and 5. A bracket 22 is provided on this side of the circuit board 21 for receiving a battery 24, and for making connections to the circuit on the chassis 20.

A cover member 16 is provided which is U-shaped and may be formed from flat metal stock. The cover includes end 17 and sides 18 and 19, which form the second end and a pair of opposite outer sides of the housing. Grooves 29 are molded in the side walls 12 and 13 of the frame for receiving the sides 18 and 19 provided by the cover. Side 19 of the cover 15 slides along the web 14 of the housing. The end wall 17 of the cover is adjacent wall 15 of the housing and has an opening 25 for receiving the actuator 26 of a switch secured to the chassis 20. The chassis may also include a sound transducing device and openings 27 are provided in the wall 17 through which sound can pass to be heard by the user of the device. A retaining clip 28 is provided on the cover 16 so that the pager or other radio receiver can be held in a pocket or on the belt of the user.

As insulating flexible plastic member 30 is provided having a mounting portion 31 secured to the inside of the end wall 11 of the frame member 10, and flaps 32 and 33 extending therefrom. The mounting portion 31 can be secured to the end wall 11 by rivets 34, which can also be used to provide external connections to the radio, as for charging the battery. The flap 32 is constructed to be folded down into engagement with the circuit board 20, and has ribs 35 at the edges and in the center which bear against the chassis to hold the same in position within the frame member 10. The flap 33 on the member 30 covers an opening 36 in the web 14, through which the battery is inserted to place the same in the bracket 21 and engages the battery to hold the same in place.

The parts shown in exploded positions in FIG. 2 are held assembled by dropping the chassis 20 into the frame 10 and folding the insulating flap 32 on top of the chassis to provide an insulating cover over the circuit conductors thereon. Then the cover 16 is slipped onto the frame member 10, with the sides 18 and 19 within grooves 29 in the side walls 12 and 13 of the frame member. FIG. 6 is a cross-sectional view showing the assembled structure. As previously stated, the member 30 is made of flexible insulating material and the flap 32 thereof has ribs 35 which bear against the chassis to hold the same within the frame 10. The side 18 of the cover 16 provides pressure against the flap 32 which exerts resilient pressure on the chassis. Pads 38 of resilient material are secured to the sides 12 and 13 of the frame member 10 to resiliently hold the chassis in position laterally. The flap 33 also has ribs 33a which bear against the battery 24, with the flap 33 being held in position by the side 19 of the cover 16. The chassis is resiliently held in the housing by the flaps 32 and 33, the resilient pads 38 and other resilient members which engage the frame member 10 and/or cover 16.

The cover 16 is held in closed position on the frame 10 by a detent arrangement which is shown in FIGS. 3, 4 and 5. FIG. 3 shows the back side of the web 14 of the frame member 10. This includes a plastic member 40 having a projection 41 at its end. A spring 42 bears upwardly against the member 40 (FIGS. 4 and 5). The projection 41 is positioned to extend into an opening 42 in the side 19 of the cover 16, which is positioned under the top of the retaining clip 28 (FIG. 4), when the cover is closed. The projection 41 tends to hold the cover 16 in closed position with respect to the frame member 10. As shown in FIG. 4, the projection 41 has rounded edges so that wen pressure is applied, the spring 43 will flex so that the projection 41 moves down and the cover 16 can slide with respect to the frame member 10.

In FIG. 5, the cover is shown slid to a position in which the end 19a of the side 19 clears the end of the flap 33, so that the flap can be flexed upwardly as shown. This provides access to the battery 24 through the opening 36 in the web 14. An opening 37 is provided in the flap 32, and this is clear of the side 18 of the cover, so that an elongated object can be used to press against the battery 24 to force the same through the opening 36. The user of the radio can, therefore, change the battery with the cover in the position shown in FIG. 5. The flap 33 has an end 33b which engages the edge 36a of the opening 36 in web 14 to hold the battery in position when the cover 16 is slid to the position shown in FIG. 5. The flap is shown in this position in FIG. 4. The cover can then be slid closed so that the projection 41 enters the opening 42 in the cover 16 to hold the cover closed. This opening of the cover 16 to provide access to the battery 24 does not expose the chassis 20, as the movement of the side 18 of the cover to the position shown in FIG. 5 merely exposes a portion of the insulating flap 32 which is between the chassis 20 and the cover side 18. This flap is held by the cover side 18 when in this position, so that it covers the chassis.

The cover 16 is held against further removal, when in the position shown in FIG. 5, by engagement between the projection 41 on member 40 and a tongue 44 formed in the side 19 of cover 16. The tongue 44 is formed by a punched opening 45 in the side 19 of cover 16 (FIGS. 2 and 7), and fits into a recess 46 in the projection 41 (FIGS. 3 and 7). This interengagement, which is shown in FIG. 7, prevents the complete removal of the cover 16 from base 10.

In order to release the interengagement between tongue 44 and projection 41, a tool or key 48 is provided, which is shown in FIG. 8. This is a plastic bar having a head 50 thereon, with a pair of transverse ribs 52 projecting therefrom. The key can be placed under the clip 28 (FIG. 5), with the ribs 52 engaging the projection 41 on the opposite sides of the recess 46. In FIG. 6, the ribs 52 on the key 48 are shown by dotted lines. Pressure on the clip 28 will then cause the ribs 52 on the key to move the projection 41 downward. This flexes the spring 43, so that projection 41 will move below the cover 16 and the interengagement between the projection 41 and the tongue 46 is released. The cover 16 can then be completely removed from the frame member 10.

As shown in FIG. 3, the web 14 of the frame 10 has a further opening 39 therein. This permits inspection of components 23 on the chassis 20 without removing the chassis from the frame. For example, the receiver may have selective devices for responding to particular paging codes. The devices can be placed so that indications thereon are visible through the opening 39 to make it possible to determine the code to which the receiver will respond.

The housing assembly described provides a complete housing formed by a frame member and a cover member. The members are held in assembled relation by the engagement of the detent on the frame with openings in the cover, and no screws or other removable connecting elements are required. This makes it possible to open the housing as required to change the battery without the use of a screwdriver or other tool. However, a tool is required to completely open the housing to provide access to the chassis. The assembled housing has a neat appearance with no screw beads or other fastening devices to disturb the styling lines. As the chassis has no external connections, it can be removed when required without disconnecting leads.

We claim:

1. Miniature battery operated radio apparatus including in combination, a frame member having portions forming one end and two opposite sides of a housing, a radio chassis positioned within said frame member, said frame member having a portion with an opening adapted to receive a battery adjacent said one end of the housing, a U-shaped cover member forming the opposite end and two opposite sides of the housing, said frame member being adapted to receive said cover member in sliding relation thereon, with said cover member having a first position with respect to said frame member to form a completely enclosed housing, detent means cooperating with said cover member to hold said cover member in said first position, said cover member being slidable to a second position with respect to said frame member to open said housing adjacent said one end thereof to provide access to a battery therein, said cover member having a portion cooperating with said detent means to hold said cover member in said second position and prevent complete removal of said cover member.

2. Radio apparatus in accordance with claim 1 wherein said detent means includes a spring biased member secured to said frame member and having a projecting portion, and said cover member has an opening to receive said projecting portion when said cover member is in said first position.

3. Radio apparatus in accordance with claim 2 wherein said spring biased member is a plastic member flexibly secured to said frame member, and including a leaf spring engaging said plastic member to hold said projecting portion in position to engage said cover member.

4. Radio apparatus in accordance with claim 2 wherein said cover member has a cut out portion forming a tongue which engages said projecting portion of said detent means when said cover member is in said second position, whereby said spring biased member must be moved so that said projecting portion clears said tongue to permit movement of said cover member from said second position to permit removal thereof from said frame member.

5. Radio apparatus in accordance with claim 4 wherein said projecting portion has a recess shaped to receive said tongue to provide interengagement therebetween.

6. Radio apparatus in accordance with claim 1 including a resilient insulating member having a mounting portion with first and second flaps extending on opposite sides thereof, means securing said mounting portion to said one end of said frame member, said first flap extending over said chassis and said second flap extending over said battery opening in said frame member, said chassis being held in position within said frame member by said first flap extending thereover and engagement thereof by said cover member.

7. Radio apparatus in accordance with claim 6 wherein said first flap has ribs thereon for engaging said chassis to resiliently hold said chassis within said frame member.

8. Radio apparatus in accordance with claim 7 including resilient means on said frame structure engaged by said chassis when positioned on said frame structure.

9. Radio apparatus in accordance with claim 6 wherein said second flap extending over said battery opening has a free end which moves past said cover member in said second position, and flexes to permit movement of a battery through said opening.

10. Radio apparatus in accordance with claim 9 wherein said first flap is held against said chassis by said cover member when in said first and second positions, and said first flap has an opening therein affording access to the battery when said cover member is in said second position.

11. Minature battery operated radio apparatus including in combination, a frame member having portions forming one end and two opposite sides of a housing, a radio chassis positioned within said frame member and including battery receiving means adjacent said one end of said frame member, a U-shaped cover member forming the opposite end and two opposite sides of the housing, said frame member being adapted to receive said cover member in sliding relation thereon, with said cover member having a first position with respect to said frame member to form a completely enclosed housing, a resilient insulating member having a mounting portion secured to said one end of said frame member and at least one flap extending from said mounting portion and positioned over said chassis, said cover member in said first position engaging said flap and cooperating therewith to hold said chassis in position within said frame member, said cover member being slidable with respect to said frame member to remove the same therefrom, whereby said flap is movable to a position to permit removal of said chassis from said frame member.

12. Radio apparatus in accordance with claim 11 wherein said resilient insulating member has a movable portion adjacent said one end of same frame member and positioned over said battery receiving means, said cover member in said first position engaging said movable portion and cooperating therewith to hold said battery in position, said cover member being slidable on said frame member to a second position to open the housing at said one end thereof and release said movable portion to permit movement thereof for removal of a battery from said battery receiving means.

* * * * *